Figure 1:
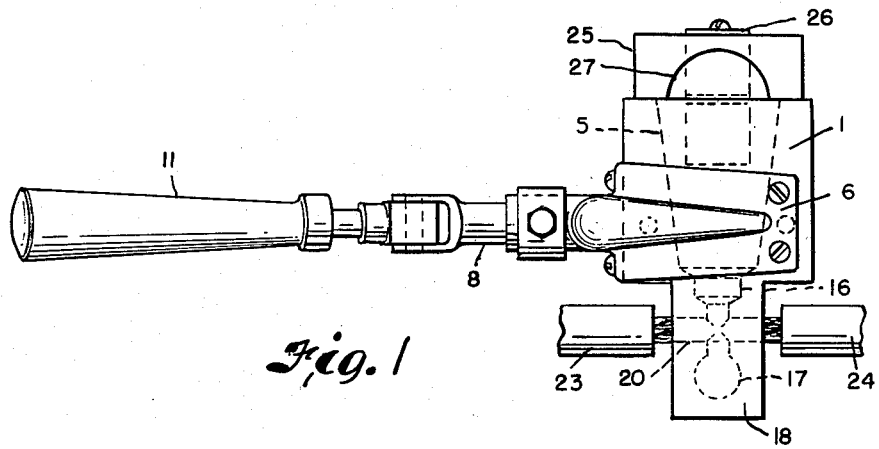

INVENTOR.
DONALD J. BURKE
BY
Oberlin & Limbach
ATTORNEYS.

United States Patent Office 3,004,310
Patented Oct. 17, 1961

3,004,310
WELDING APPARATUS
Donald L. Burke, East Cleveland, Ohio, assignor to Erico Products, Inc., Cleveland, Ohio, a corporation of Ohio
Original application Jan. 16, 1953, Ser. No. 331,634. Divided and this application Apr. 9, 1954, Ser. No. 422,032
4 Claims. (Cl. 22—116)

This invention relates as indicated to novel welding apparatus, and more particularly to apparatus and a method of welding for joining together the ends of cables and the like utilizing a metal-producing exothermic reaction mixture of the general type disclosed in Patent No. 2,229,045 to Charles A. Cadwell.

The welding material disclosed and claimed in such Cadwell patent has been very successfully employed in the cast welding of rail bonds to the sides of rails and for many other purposes. Such welding material comprises a mixture of copper oxide and a crushed copper aluminum alloy which when ignited will produce a charge of molten copper suitable for immediate use in the welding of a copper or copper alloy stranded conductor to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Patent No. 2,654,129 to Edward B. Neff teaches an improved form of cast welding apparatus adapted to be employed with the metal producing exothermic reaction mixture.

Because of the high temperature evolved by the exothermic reaction, it is feasible, under properly controlled conditions, to perform a cast welding operation utilizing but a very small charge of the molten metal. This renders it practical and economical to perform such operations as the welding of small signal bonds to the heads of steel rails and to weld stranded conductors to pipe lines, for example. When handling such small bodies of molten metal, however, there is obviously the problem of premature chilling before an adequate weld is obtained, and this is particularly important when electrical connections are to be made thereby. There must be a sufficient body of heat to achieve the weld. Small amounts of certain fluxing agents may be of assistance but for certain types of work, such as the welding together of two opposed cable ends, it has in the past been necessary to utilize a somewhat larger amount of weld metal than would be desirable, in order to ensure a connection which is both physically strong and of sufficient current-carrying capacity. Thus, when two opposed copper cable ends have been welded using the exothermic reaction material of Cadwell Patent 2,229,045, the weld metal will ordinarily form a cast weld connection of somewhat greater diameter than the cable itself and also extending along or sleeving the respective cable end portions to some extent. While quite satisfactory for many purposes, this type of weld obviously forms an unsightly bump or lump when wrapped with insulating tape or the like and may not be acceptable where the cable is to be repeatedly wound and unwound on a drum as in the case of certain electrically driven mine cars, for example.

It is accordingly a principal object of my invention to provide a method of welding producing cast welds having good electrical conductivity and high mechanical strength so that it may be employed in the formation of relatively small cast welds which will nevertheless have the requisite current-carrying capacity and mechanical strength to meet the conditions of use.

Still another object is to provide such cast weld connections which will not be brittle but will instead be mechanically strong and resistant to shock.

A further object is to provide welding apparatus and a method of welding particularly suitable for joining together the ends of stranded conductors such as copper cable and the like.

Another object is to provide apparatus adapted to mold a strong cast welded connection between opposed conductor ends of no greater diameter than such conductors.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 2:
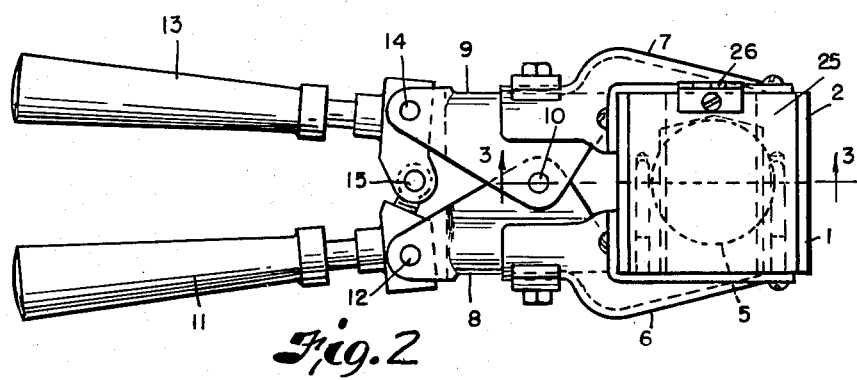
Figure 3:
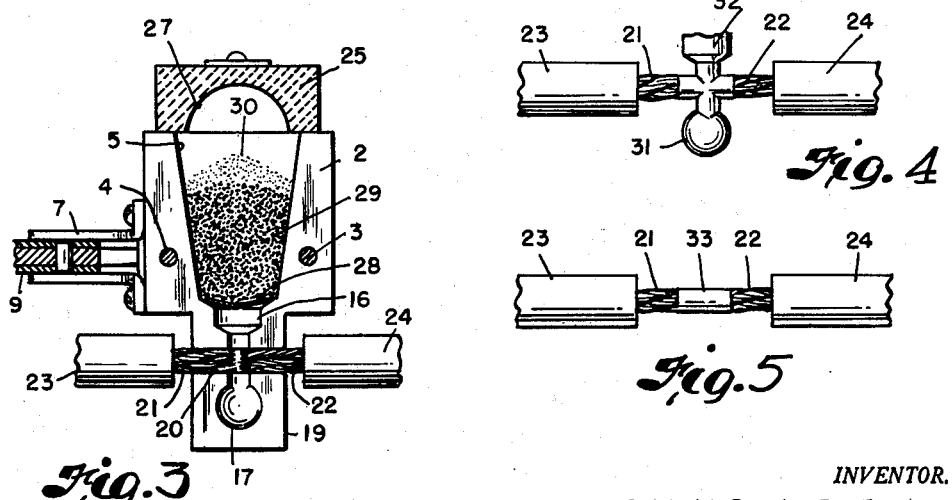
Figure 4:
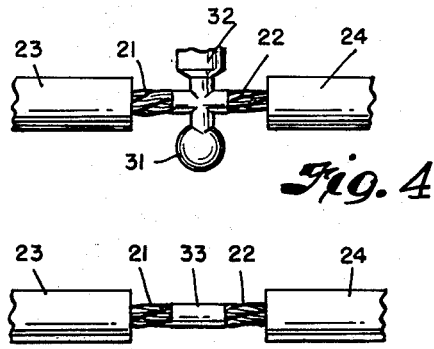
Figure 5:

In said annexed drawing:
FIG. 1 is a side elevational view of one preferred form of cast welding apparatus especially designed for the joining together of stranded cables;
FIG. 2 is a top plan view of such apparatus;
FIG. 3 is a vertical section taken on the line 3—3 on FIG. 2;
FIG. 4 shows a cast weld connection as produced by my new apparatus and method; and
FIG. 5 illustrates such connection after trimming.

Referring now more particularly to such drawing and especially FIGS. 1 and 2 thereof, the embodiment of my invention there illustrated comprises two graphite crucible and mold blocks 1 and 2 mounted for movement toward and away from one another on guide pins 3 and 4, such blocks being hollowed out to form a vertically split crucible 5. The graphite blocks 1 and 2 are respectively engaged by and secured to (as by means of screws) supporting members 6 and 7 in the form of sheet metal stampings, these latter in turn being carried by frame members 8 and 9 pivotally joined at 10 for swinging movement whereby blocks 1 and 2 may be moved apart (pins 3 and 4 projecting but a short distance into block 2 and therefore capable of disengagement by such swinging movement). Handle 11 is pivotally connected to frame member 8 at 12 and handle 13 is similarly pivotally connected to frame member 9 at 14, the inner ends of such handles themselves being pivotally joined at 15 to obtain a form of toggle action, pivots 12, 14 and 15 being in substantial alignment with one another when graphite blocks 1 and 2 are in closely juxtaposed position.

Crucible 5 will preferably be of downwardly tapering conformation, as illustrated, and provided with a central sprue passage 16 of somewhat smaller diameter than the bottom of the crucible. Such sprue passage then narrows and descends vertically to a spherical cavity 17 defined by the opposed lower portions 18 and 19 of blocks 1 and 2 respectively. Such sprue passage is intersected by a transverse passage 20 likewise defined by the opposed graphite block portions 18 and 19 and being adapted to receive the end portions 21 and 22 of stranded conductors or cables from which the insulation 23 and 24 has been stripped. The two semi-cylindrical grooves in the opposed faces of block portions 18 and 19 defining passage 20 will be dimensioned thus to receive the stranded cable end portions and tightly to embrace and enclose the latter to prevent escape of molten weld metal dropping down from crucible 5 through sprue 16.

A graphite cover 25 will desirably be provided hinged by means of hinge 26 to block 2 and provided with a cavity 27 extending from the top of crucible 5 and opening laterally to permit the escape of gases produced by the exothermic reaction without danger of such gases, flame, and particles from the reaction mixture being blown upwardly toward the operator's face.

After stripping the insulation from the cable end portions about 1½ inches from the end, such end portions 21 and 22 are inserted in passage 20 with the two mold blocks slightly spaced apart. When the cable ends have been properly positioned, leaving a slight distance therebetween (usually about 1/16 to 1/8 inch) as shown in FIG. 3 in vertical alignment with sprue passage 16, handles 11 and 13 will be moved apart to bring the two graphite blocks into close engagement with the cable ends clamped therebetween. The cables may additionally be clamped, if desired, beyond the mold to ensure against accidental displacement during the welding operation. A thin metal disk 28 which may be of steel, for example, and slightly dished, is next dropped into crucible 5 and positioned over the sprue opening as shown. When such disk has been seated, a cartridge of exothermic reaction material 29 of the general type disclosed in Cadwell Patent No. 2,229,045 may be inverted into the crucible with the ignition powder 30 on top. The cover 25 is now lowered into the position shown in FIGS. 1, 2 and 3 of the drawing and a spark gun discharged into the opening 27 to ignite the starting powder 30. The exothermic reaction which immediately takes place produces the desired charge of molten copper metal which promptly melts through the disk 28 and drops down through sprue 16. The first molten metal which engages the ends of the stranded conductors 21 and 22 continues therepast into the lower cavity 17 and serves the purpose of preheating the end portions of the strands of cables 21 and 22 and also of heating the portions of the graphite blocks enclosing the latter. When cavtiy 17 has been filled by molten metal and likewise the lower portion of the sprue leading thereto, the following molten metal is intruded into the interstices between the preheated cable strands and flows a short distance in each direction along passage 20, merging with each individual strand and forming an integral weld therewith. The remaining portion of the molten metal charge accumulates in the upper portion of sprue passage 16 together with the lighter fluxing ingredients. After a delay of about ten seconds, handles 11 and 13 may be operated to move blocks 1 and 2 apart sufficiently to permit withdrawal of the cable ends and the cast weld joining the same. Such cast weld is shown in FIG. 4 including the spherical portion 31 formed in chamber 17 and the upper portion 32 formed in the upper portion of sprue 16. These two overflows, as they may be termed, may be trimmed away as shown in FIG. 5 to leave a cylindrical cast weld connection 33 of a diameter substantially that of the stranded cables 21 and 22. The exposed portions of such cables and the connection may now readily be covered with insulation which need not be of any greater thickness than the insulation 23 and 24, thereby achieving not only the best possible appearance but also avoiding a hump which would further limit flexibility of the cable at this point and is an impediment to proper winding and free travel of the cable.

In order that a cast weld connection of the small size shown in FIG. 5, for example, may have adequate physical strength and current-carrying capacity for difficult conditions of use, it is necessary that such small weld shall have improved grain structure and that it be thoroughly integrally joined with the individual conductor strands. To obtain such improved results, I modify the exothermic reaction mixture in the manner explained below.

I have found that if small amounts of certain nonferrous metals are incorporated in the exothermic reaction mixture in the proper manner to alloy with the molten copper produced thereby, the weld metal has an improved wetting effect on the metal parts with which it is intended to join, the molten weld metal may be produced at a somewhat lower temperature and therefore has less tendency to embrittle the strands of a cable or the like, and a very strong weld is obtained capable of withstanding rough handling in use. I have discovered, particularly, that a small amount of silver incorporated in the reaction mixture or otherwise introduced to alloy with the molten weld metal produces an especially beneficial effect. The following specific examples of suitable exothermic reaction materials for producing weld metal in accordance with my invention are set forth for purposes of illustration only, and it will be understood that a variety of other formulations may be utilized instead, as explained below:

*Example I*

| | Parts by weight |
|---|---|
| Copper scale (roasted) | 71.83 |
| Copper aluminum alloy, crushed (57% copper, 43% aluminum) | 20.41 |
| Calcium silicon | 2.04 |
| Fluorspar | 2.04 |
| Zinc oxide | .68 |
| Silver | 3.00 |
| | 100.00 |

*Example II*

| | Parts by weight |
|---|---|
| Copper scale (roasted) | 73.69 |
| Copper aluminum alloy, crushed (50% copper, 50% aluminum) | 18.48 |
| Calcium silicon | 2.07 |
| Fluorspar | 2.07 |
| Zinc oxide | .69 |
| Silver | 3.00 |
| | 100.00 |

*Example III*

| | Parts by weight |
|---|---|
| Copper scale (roasted) | 71.45 |
| Copper aluminum alloy, crushed (57% copper, 43% aluminum) | 20.30 |
| Calcium silicon | 2.03 |
| Fluorspar | 2.03 |
| Zinc oxide | .68 |
| Phosphorus-copper alloy (85% copper, 15% phosphorus) | 3.51 |
| | 100.00 |

*Example IV*

| | Parts by weight |
|---|---|
| Copper scale (roasted) | 73.30 |
| Copper aluminum alloy, crushed (50% copper, 50% aluminum) | 18.38 |
| Calcium silicon | 2.06 |
| Fluorspar | 2.06 |
| Zinc oxide | .69 |
| Phosphorus-copper alloy (85% copper, 15% phosphorus) | 3.51 |
| | 100.00 |

In producing the improved exothermic reaction mixtures of this invention, I utilize a reaction mixture such as that taught in Cadwell Patent 2,229,045, adding a small amount, ordinarily from about 2 to 8% of the alloying metal thereto, or preferably substituting such alloying metal for an equivalent amount of the copper present as metal in the reaction mixture. Thus, the basic reaction mixture will ordinarily comprise from about 30 to about 90 parts by weight of copper oxide (roasted copper mill scale) and from about 14 to about 30 parts by weight of copper aluminum alloy, the latter comprising from about 30 to 70% copper and from about 70 to about 30% aluminum, the usual preferred composition being about 57% copper and about 43% aluminum. A specific preferred example of such copper producing exothermic reaction material may be given as follows:

| | Parts by weight |
|---|---|
| Copper scale (roasted) | 74.05 |
| Copper aluminum alloy (57% copper, 43% aluminum) | 21.05 |
| Calcium silicon | 2.10 |
| Fluorspar | 2.10 |
| Zinc oxide | .70 |
| | 100.00 |

When alloying metal such as silver is added, the copper and aluminum will ordinarily each comprise about 50% of the copper aluminum alloy (see Example II above, which is a preferred embodiment of this invention).

The small amounts of calcium silicon, fluorspar and zinc oxide included in the several foregoing mixtures afford a desirable fluxing action and enhance the soundness of the weld metal. When a thin steel disk is utilized to close the sprue opening of the crucible, the metal therefrom will likewise be incorporated in the weld metal when it is melted by the heat of the exothermic reaction but inasmuch as such disk is ordinarily extremely thin, the amount of iron added thereby is usually inconsequential.

The copper producing exothermic reaction mixture last listed above may be modified by substituting for a portion of the copper present as metal a generally equivalent amount of silver, phosphorus, zinc, tin, or aluminum in amounts ranging from about 2 to about 8% of the total weight of the reaction mixture. Thus, the amount of copper in the copper-aluminum alloy may be reduced somewhat so that the heat of the molten metal produced by the exothermic reaction mixture would be rather greater than desired if it were not for the presence of the alloying metal intermixed therewith. With the exception of phosphorus and zinc, the indicated alloying metals may be dispersed through the reaction mixture in granular or finely divided form, but it is generally preferred that they be incorporated in that part of the mixture lying in the lower part of the crucible and this is quite important in the case of materials such as phosphorus and zinc having relatively low boiling points. This may be done in the case of silver, for example, by silver-plating the sprue closure disk 28 or even forming such disk of a very thin sheet of silver. The zinc, tin and aluminum may be similarly employed. The phosphorus may desirably be incorporated in the form of a phosphorus-copper alloy as indicated above. Such alloy is very brittle and may simply be provided in the form of small lumps in the bottom of the crucible or bonded together with water glass (sodium silicate), for example, to form the sprue closure disk. In general, any non-ferrous alloying ingredient which it is desired to employ in the copper producing exothermic reaction mixture and which has a relatively low boiling point (i.e. below about 3500° F.) should be placed at or near the bottom of the crucible inasmuch as the exothermic reaction between the aluminum and the copper oxide, even though modified by the presence of copper as metal in the amounts indicated, is sufficient to generate a momentary localized temperature on the order of 4000° F. Silver which has a boiling point of 3634° F. may be dispersed throughout the reaction mixture with satisfactory results although it may be preferred to concentrate the silver in the lower part of the crucible where the heat is not as intense. With alloying elements boiling below about 3000° F. it becomes very desirable to place the same in the lower part of the crucible and with those boiling below 2500° F. it is most important.

Utilizing a copper producing exothermic reaction mixture conforming to the formulation last given above but with 3½% silver filings incorporated in the mixture, a cast weld was produced which upon analysis had the following composition:

| | Percent |
|---|---|
| Copper | 93.45 |
| Aluminum | 1.69 |
| Silicon | .40 |
| Iron (from sprue closure disk) | .95 |
| Silver | 3.35 |
| | [1] 99.84 |

[1] (.16% unaccounted for.)

The cast weld having the composition above given was physically strong and not brittle under impact. The weld metal was employed to splice together two ½ inch diameter copper bus bars, and it was found that a weld of no greater diameter than the bars had excellent current-carrying capacity and excellent strength under all conditions of use.

When the alloying metal has a boiling point on the order of 2500° F. or less ( e.g. zinc), it is very important that it be placed in the bottom of the crucible to avoid substantial volatilization by the heat of the reaction. Alloying metals may sometimes be provided in the form of their oxides and substituted for a portion of the roasted copper scale (largely $Cu_2O$), but only when their boiling points are sufficiently high to avoid volatilization by the intense heat of the reaction. It is difficult to control such reactions, however, wherein other metal oxides take part and it is ordinarily preferred to incorporate the alloying material as metal in finely divided form (such as small filings) throughout the mixture or, if of low boiling point, in the lower portion of the crucible.

Various copper alloys or solders are well known in the brazing art, one of the best known being "silver solder" which contains from about 30% to about 50% silver by weight, and sometimes as much as 72%, the balance being copper, with sometimes some zinc. Such solder is, of course, very expensive but may be used in small quantities due to its great wetting ability. Although very weak itself it is nevertheless capable of forming a strong butt joint between two parts if in a sufficiently thin film, on the order of about .004 inch or slightly more. In contrast thereto, I have found that if silver is incorporated in a copper-producing exothermic reaction mixture of the type indicated in an amount to yield a copper-silver alloy containing only from about ½% to about 10% silver by weight (the balance being substantially all copper) such alloy not only has greatly enhanced wetting properties whereby an improved weld may be made with stranded copper conductors, bus bars, steel rail heads, and the like, but also a most unexpectedly improved mechanical strength. Cast welds of such materials will withstand heavy shocks and blows to a surprising degree even when the cast weld metal is of a thickness far exceeding that at which silver solder can effectively be utilized. I prefer to employ from about 1½% to about 8% silver by weight in the cast weld metal alloyed with the copper, and ordinarily from 3% to 5% silver is most effective for my purpose.

Nickel may be substituted for a portion of the silver indicated above with good results and a considerable saving in cost. If the nickel largely or completely replaces the silver, however, the effect is less satisfactory although still an improvement over the unalloyed copper as produced from the exothermic reaction material of Cadwell Patent 2,229,045. I am aware that it has been proposed in the past to alloy nickel with copper weld metal, but only in much larger proportions of at least 15% and usually much more. My weld metal, by contrast, may comprise about 2% silver and about 2% nickel, for example, with the balance copper, and even when the nickel is employed alone with the copper it will not exceed about 7% by weight.

Utilizing the principles of my invention I am enabled to produce sound welds of copper metal alloyed with small amounts of other elements to improve the physical characteristics of the weld despite the fact that the amount of weld metal produced may be so small as to have but a small reservoir of heat to effect the weld. Large amounts of phosphorus or nickel, for example, reduce the electrical conductivity of the welded connection. Most of the phosphorus (which has a desirable de-oxidizing action) is driven off by the heat of the reaction, preferably leaving only about .1% to .5% by weight in the final weld, with .2% usually best. About .25% to about 1% and ordinarily about .53% phosphorus should be present in the bottom of the crucible to achieve this result.

With small welds, such as those joining copper cable ends and bus bars, it is important to preheat the surfaces to be welded. Otherwise such surfaces will so cool the weld metal due to their high conductivity that only a partial weld will be obtained, if indeed any. The alloying materials specifically mentioned enhance the wetting ability of the molten copper and also improve the strength of the finished weld. Good electrical conductivity may moreover be maintained.

This application is a division of my co-pending application Serial No. 331,634, "Welding Composition and Method of Welding," filed January 16, 1953.

Other modes of applying the principle of the invention may be employed, change being made as regards the details described, provided the features stated in any of the following claims or the equivalent of such be employed.

I therefore particularly point out and distinctly claim as my invention:

1. Apparatus for cast welding together the opposed ends of stranded conductor cables and the like comprising two graphite blocks adapted to have flat lateral surfaces closely juxtaposed, supporting frame members secured to said respective blocks and pivotally connected for swinging movement of said blocks toward and away from each other, handles connected to said frame members for thus pivotally swinging said frame members, toggle means interconnecting said handles operative to lock the same with said blocks in close engagement, cooperative guide means on said blocks adapted precisely to position the latter during opening and closing movement, said blocks having their opposed faces hollowed out to form a downwardly tapering vertically split crucible opening to the top of said blocks, a sprue passage of less diameter than the bottom of said crucible extending vertically downwardly from such bottom and terminating in a spherical cavity, and a horizontal transverse passage of generally uniform cross-section extending through the block assembly and intersecting said vertical sprue passage, the line of division between said blocks extending centrally through each such passage and cavity, and a graphite cover for said crucible hinged to one of said blocks and hollowed out to open to the exterior laterally of the block assembly.

2. The method of forming a copper alloy with a small proportion of another metal having a boiling point on the order of 3500° F. and less which comprises placing a charge of copper-producing exothermic reaction mixture in the lower portion of a crucible having admixed therewith finely divided particles of the alloying metal, such reaction mixture comprising principally copper oxide and copper-aluminum alloy, placing an additional quantity of such copper-producing mixture in such crucible above such first charge, such alloying metal being present in substantial amount in such first charge only, and igniting such charges to produce molten metal, the heat developed in the upper portion of such crucible being considerably greater than that in the lower portion.

3. The method of forming a copper-silver alloy containing from about ½% to about 10% silver by weight which comprises placing a small charge of copper-producing exothermic reaction material in the lower portion of a crucible having admixed therewith finely divided particles of silver, such reaction mixture comprising principally copper oxide and copper-aluminum alloy, placing an additional quantity of such copper-producing mixture in such crucible above such first charge, such silver being present in substantial amount in such first charge only, igniting such charges to produce molten metal, the heat developed in the upper portion of such crucible being considerably greater than that in the lower portion, and drawing off the molten copper-silver alloy thus produced from the bottom of such crucible.

4. Apparatus for connecting the opposed ends of two elongated metal members such as stranded conductor cables by a weld having a diameter substantially equal to the diameter of such elongated members; said apparatus including separable mold blocks having opposed faces shaped to define a sprue passage when abutted against one another, said sprue passage extending inwardly of said mold blocks and terminating in a cavity, aligned passages extending transversely of and intersecting said sprue passage formed between such opposed faces of said blocks and extending to respective outer sides thereof, said aligned passages being of a uniform cross-section closely to fit and conform to such members to be welded at the points where said latter passages intersect said sprue so that an enlarged mold cavity is avoided in this region and a cast weld is produced of the same diameter as such members except for adhering metal in said sprue when molten weld metal is delivered to said sprue passage sufficient to pass therealong past such opposed ends of such members to preheat the same and fill said termination cavity and sprue passage to a level including such opposed ends.

References Cited in the file of this patent

UNITED STATES PATENTS

| | | |
|---|---|---|
| 1,542,641 | Pettis | June 16, 1925 |
| 1,607,508 | Bottrill | Nov. 16, 1926 |
| 1,642,484 | Bugett | Sept. 13, 1927 |
| 1,751,811 | Guilbault | Mar. 25, 1930 |
| 1,811,292 | Barhoff | June 23, 1931 |
| 1,838,357 | Bottrill | Dec. 29, 1931 |
| 1,888,815 | Begtrup | Nov. 22, 1932 |
| 1,931,587 | Mc Connel | Oct. 24, 1933 |
| 2,024,132 | Sander | Dec. 10, 1935 |
| 2,225,028 | Banks | Dec. 17, 1940 |
| 2,464,210 | Cadwell | Mar. 15, 1949 |

FOREIGN PATENTS

| | | |
|---|---|---|
| 162,985 | Australia | Apr. 25, 1949 |

UNITED STATES PATENT OFFICE
CERTIFICATE OF CORRECTION

Patent No. 3,004,310                          October 17, 1961

Donald J. Burke

It is hereby certified that error appears in the above numbered patent requiring correction and that the said Letters Patent should read as corrected below.

In the grant, line 1, and in the heading to the printed specification, line 3, for "Donald L. Burke", each occurrence, read -- Donald J. Burke --; in the drawings, line 1, name of inventor, for "D. L. Burke" read -- D. J. Burke --.

Signed and sealed this 24th day of April 1962.

(SEAL)
Attest:

ESTON G. JOHNSON
Attesting Officer

DAVID L. LADD
Commissioner of Patents